(12) United States Patent
Angot

(10) Patent No.: US 7,823,990 B2
(45) Date of Patent: Nov. 2, 2010

(54) SPROCKETED IDLER ASSEMBLY

(75) Inventor: Daniel Marcel Désiré Angot, Peoria, IL (US)

(73) Assignee: Caterpillar Inc, Peoria, IL (US)

( * ) Notice: Subject to any disclaimer, the term of this patent is extended or adjusted under 35 U.S.C. 154(b) by 27 days.

(21) Appl. No.: 12/229,872

(22) Filed: Aug. 27, 2008

(65) Prior Publication Data

US 2010/0052418 A1 Mar. 4, 2010

(51) Int. Cl.
*B65D 57/00* (2006.01)
*F16H 55/30* (2006.01)

(52) U.S. Cl. ...................... 305/195; 305/199

(58) Field of Classification Search ......... 305/193–200, 305/202, 185, 59
See application file for complete search history.

(56) References Cited

U.S. PATENT DOCUMENTS

| | | | |
|---|---|---|---|
| 1,228,709 A | | 6/1917 | Stark |
| 1,638,140 A | * | 8/1927 | Best ........................... 305/199 |
| 1,870,801 A | | 8/1932 | Engstrom |
| 2,003,528 A | * | 6/1935 | Best ........................... 305/199 |
| 3,194,609 A | | 7/1965 | Thurlow |
| 4,030,782 A | | 6/1977 | Baylor |
| 4,081,202 A | | 3/1978 | Kozuki |
| 4,087,136 A | | 5/1978 | Boggs et al. |
| 4,106,822 A | | 8/1978 | Lee |
| 4,116,081 A | | 9/1978 | Luttrell et al. |
| 4,141,602 A | | 2/1979 | Boggs et al. |
| 4,506,934 A | | 3/1985 | Hammond |
| 5,303,992 A | | 4/1994 | Grainger |
| 5,829,849 A | | 11/1998 | Lawson |
| 6,074,024 A | | 6/2000 | Juncker |
| 6,155,943 A | * | 12/2000 | Ledvina et al. ............. 474/156 |
| 6,250,726 B1 | | 6/2001 | Burdick et al. |
| 6,536,853 B2 | | 3/2003 | Egle et al. |
| 6,733,092 B2 | * | 5/2004 | Yoshida et al. ............. 305/195 |
| 6,866,351 B2 | | 3/2005 | Yamamoto |
| 6,883,876 B2 | | 4/2005 | Yamamoto et al. |
| 7,255,184 B2 | | 8/2007 | Loegering et al. |
| 7,325,889 B2 | | 2/2008 | Yamamoto et al. |
| 2001/0045773 A1 | | 11/2001 | Rutz et al. |
| 2004/0026996 A1 | | 2/2004 | Woody et al. |
| 2007/0029878 A1 | | 2/2007 | Gaudreault et al. |
| 2008/0081719 A1 | | 4/2008 | Young |

FOREIGN PATENT DOCUMENTS

JP 2005001626 1/2005
KR 100387914 6/2003

* cited by examiner

Primary Examiner—Jason R Bellinger

(57) ABSTRACT

A sprocketed idler for a machine comprises a plurality of teeth radially disposed about an idler having a substantially circular cross section. Each of the plurality of teeth includes at least one tooth flank having a substantially uniform slope, wherein a distance between adjacent peaks of the plurality of teeth is between 30% and 90% of the distance between central axes of adjacent pin members of a track link that is engageable by the idler.

19 Claims, 4 Drawing Sheets

SPROCKETED IDLER ASSEMBLY

TECHNICAL FIELD

The present disclosure relates generally to idler assemblies for machine drive systems and, more particularly, to a sprocketed idler assembly for traction devices for machines.

BACKGROUND

Track-type machines typically include a track assembly having a plurality of interlocking links, each link being coupled to a ground-engaging traction panel. Adjacent links may be interconnected via a laterally disposed track pin to form a continuous chain. A bushing may be disposed about the track pin and configured to provide a rotatable interface at the surface of the track pin. The bushing is adapted to engage a portion of a sprocketed drive hub. As a drive motor rotates the sprocketed drive hub, teeth of the sprocketed drive hub engage spaces between the bushings forcing the track link to move in the direction of rotation of the hub, thereby propelling the machine.

In many conventional track-driven systems, as the track chain is rotated about the track frame, a surface of the idler wheel is configured to contact an upper edge (or "wear surface") of each link, subjecting the upper edge of each link to a significant portion of the weight of the machine, particularly as the link is rotated between the idler wheel and the ground. This contact produces a high coefficient of friction between the surface of the idler wheel and the wear surface of the link. As a result, any slippage or shift between the idler wheel and the wear surface may cause a significant amount of wear at the idler wheel/link interface. If allowed to persist, such wear may potentially erode a groove on the surface of the link, causing a distinctive wear pattern commonly referred to as "scalloping." Thus, in order to reduce repair and replacement costs resulting from idler/track link wear, a track assembly design that reduces wear at the idler/track link interface may be required.

At least one system for reducing idler/track link wear is described in U.S. Pat. No. 6,883,876 (the '876 patent) to Yamamoto et al. The '876 patent discloses a track assembly comprising a plurality of link members, whereby adjacent link members are connected together via laterally extending pin members having a bushing member mounted thereon for rotation of the bushing about the pin member. The track assembly also includes a roller frame having first and second end portions comprising first and second sprocketed idlers that are adapted to engage the bushings so as to reduce contact with a wear surface of the track linkage. The contact surface between each sprocket is substantially concave (or arcuate), so as to substantially conform to the shape and diameter of the link bushings.

Although the system of the '726 patent may reduce contact between the idler and the surface of the track link, significantly reducing idler and track link wear caused by grinding at the interface of the idler and track link, it may still produce a significant amount of noise and vibration. For example, the sprocketed idler assembly of the '726 patent is substantially concave in shape. Consequently, the sprocketed idler of the '726 patent is primarily designed to engage the bushings at the root of the gap between the sprocket teeth. As a result, while traveling over uneven terrain, where the weight of the vehicle shifts more dramatically than on even terrain, the bushing often contacts the root of the gap with enough force to produce significant vibration and noise. Thus, in order to further reduce noise and vibration associated with track-type machines, a system to dampen or reduce the force with which the idler contacts the bushings, may still be required.

SUMMARY

In accordance with one aspect, the present disclosure is directed toward an idler for a track-type machine, comprising a plurality of teeth radially disposed about an idler having a substantially circular cross section. Each of the plurality of teeth may include at least one tooth flank having a substantially uniform slope, wherein a distance between adjacent peaks of the plurality of teeth is between 30% and 90% of the distance between central axes of adjacent pin members of a track link that is engageable by the idler.

According to another aspect, the present disclosure is directed toward a track assembly for a track-type machine, comprising a plurality of link members and a plurality of pin members, each pin member configured to couple adjacent link members together to form a track chain. Each of the plurality of pin members may comprise a bushing disposed about a cylindrical surface thereof. The track assembly may also include at least one idler comprising a plurality of teeth disposed about a surface of the at least one idler, the at least one idler configured to engage a portion of the bushing and substantially limit contact between the at least one idler and a surface of the plurality of link members, wherein one or more of the plurality of teeth includes a tooth flank having a substantially uniform slope.

In accordance with another aspect, the present disclosure is directed toward a track-type machine, comprising a driving mechanism for generating a torque output and a drive sprocket, operatively coupled to the driving mechanism and configured to rotate in response to the torque output generated by the driving mechanism. The track-type machine may also include a track assembly, comprising a plurality of link members and a plurality of pin members, each pin member configured to couple adjacent link members together to form a track chain. Each of the plurality of pin members may comprise a bushing disposed about a cylindrical surface thereof. The track assembly may also include at least one idler including a plurality of teeth disposed about a surface of the at least one idler, the at least one idler configured to engage a portion of the bushing and substantially limit contact between the at least one idler and a surface of the plurality of link members, wherein one or more of the plurality of teeth includes a tooth flank having a substantially uniform slope.

DETAILED DESCRIPTION

Figure 1:
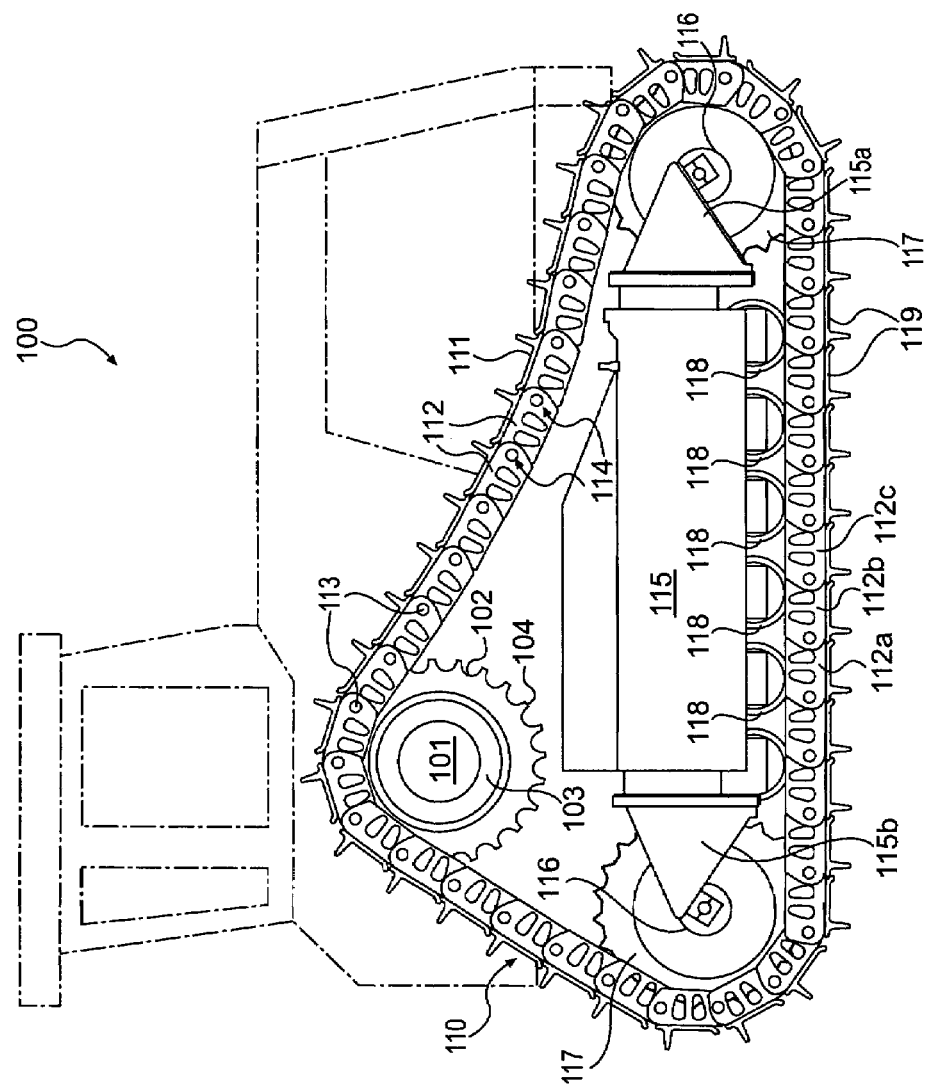
FIG. 1 illustrates an exemplary track-type machine consistent with the disclosed embodiments.

FIG. 1 illustrates an exemplary disclosed track-type machine 100 consistent with the disclosed embodiments.

Track-type machine 100 may embody any machine that is driven, propelled, positioned, and/or maneuvered by operating a "continuous" track-type traction device. Such machines may include, for example, track-type tractors, skid steers, dozers, excavators, backhoes, track loaders, front shovels, or any other type of track-maneuverable machine. Track-type machine 100 may include a driving mechanism 101, a drive sprocket 102 mounted on a drive hub 103 and coupled to driving mechanism 101, and a track assembly 110 operatively coupled to driving mechanism 101 by drive sprocket 102 and configured to propel the machine when driven by driving mechanism 101.

Driving mechanism 101 may include one or more components configured to generate a torque output. For example, driving mechanism 101 may include any suitable type of internal combustion engine, such as a gasoline, diesel, natural gas, or hybrid-powered engine or turbine. Alternatively or additionally, driving mechanism 101 may embody an electric motor, electrically coupled to an electric power source and configured to convert at least a portion of the electrical energy form the electric power output into mechanical energy. According to yet another embodiment, driving mechanism may include a hydraulic motor, fluidly coupled to a hydraulic pump and configured to convert a fluid pressurized by the pump into a torque output.

Drive sprocket 102 may be coupled to driving mechanism 101 via a shaft (not shown), which may be coupled to the driving mechanism to provide an interface for delivering torque generated by driving mechanism 101 to drive sprocket 102. For example, drive sprocket 102 may be secured (e.g., welded, bolted, heat-coupled, etc.) to a hub 103 associated with a shaft (not shown), so that drive sprocket 102 rotates in response to the torque generated by driving mechanism 101. According to one embodiment, drive sprocket 102 may be directly coupled via a drive shaft to driving mechanism. Alternatively, drive sprocket 102 may be coupled to driving mechanism 101 via a torque converter (such as a gearbox, transmission, etc.), so that rotation of drive sprocket 102 is proportional to the torque generated by driving mechanism 101.

Drive sprocket 102 may include a plurality of teeth 104 configured to engage a portion of track assembly 110 such that a rotational force applied to drive sprocket is delivered to the track assembly 110. Teeth 104 of drive sprocket 102 may be of any appropriate size and shape suitable to engage and rotate track assembly. According to one embodiment, flank faces of adjacent teeth 104 may provide a substantially concave formation for engaging cylindrical bushings 114 of track assembly 110.

Track assembly 110 may include a plurality of components that form the "continuous" track, ground-engaging portion of the drive system of machine 100. Track assembly 110 may include, among other things, a chain assembly 111 having a plurality of link members 112, a roller frame assembly 115, at least one idler, such as sprocketed idler 117, and a plurality of rollers 118. The components of track assembly 110 listed above are exemplary only and not intended to be limiting. Accordingly, it is contemplated that track assembly 110 may include additional and/or different components than those listed above. For example, track assembly 110 may also include a plurality of track shoes 119, which may be affixed to each of link members 112 to provide protective, treaded covering for link member 112.

Chain assembly 111 may comprise a plurality of link members 112 that are coupled together to form a continuous chain ground-engaging track. For example, adjacent (e.g., consecutive) link members, such as link members 112a, 112b, and 112c, may be coupled together via a plurality of pin members 113, each pin member having a rotatable bushing 114 disposed thereon. Rotatable bushing 114 may be engaged by drive sprocket 102 that, when driven by driving mechanism 101, may force chain assembly 111 to move in a direction of rotation of drive sprocket 102.

Roller frame assembly 115 may include one or more axles and/or any other suitable structure for supporting a substantial portion of the weight of machine 100. According to one embodiment, roller frame assembly 115 may embody the primary frame or chassis of machine 100, upon which many of the components (e.g., driving mechanism 101, drive sprocket 102, operator cab, etc.) of machine 100 may be mounted and secured. Although FIG. 1 depicts track-type machine 100 as comprising a single roller frame assembly, it is contemplated that track-type machine 100 may include multiple roller frame assemblies. According to one embodiment, track-type machine 100 may comprise at least one roller frame assembly 115 for each track assembly 110 associated with machine 100.

Roller frame assembly 115 may include a first portion 115a and a second portion 115b. According to one embodiment, first portion 115a may embody the front end of roller frame assembly 115, and second portion 115b may embody the rear end of roller frame assembly 115. Each of first portion 115a and second portion 115b of roller frame assembly 115 may include an idler hub 116 adapted for mounting an idler, such as a sprocketed idler 117, thereon.

Roller frame assembly 115 may be configured to receive a plurality of rollers 118 that cooperate to provide a platform upon which roller frame assembly 115 may roll during movement of track-type machine 100. Rollers 118 may embody any suitable type of heavy-duty wheel that may be configured to interact with chain assembly 111 so as to guide and position chain assembly 111 as it travels around roller frame assembly 115. Rollers 118 may be affixed to a bottom portion of roller frame assembly 115 such that a portion of each of rollers 118 travels atop bushings 112 substantially within a channel created by interlocking link members 112 of chain assembly 111.

As explained, each of first portion 115a and second portion 115b may include idler hub 116, upon which sprocketed idler 117 may be mounted. Sprocketed idler 117 may provide a mechanical interface that guides chain assembly 111 around roller frame assembly 115 and provides lateral support for maintaining the position of chain assembly substantially beneath machine 100. For example, as illustrated in FIG. 1, when track-type machine 100 is traveling forward, sprocketed idler 117 associated with first portion 115a of roller frame assembly may receive chain assembly 111 from drive sprocket 102 and guide chain assembly 111 around front portion 115a, maintaining chain assembly 111 in position for engagement by rollers 118. Similarly, sprocketed idler 117 associated with second portion 115b may receive chain assembly 111 from rollers 118 beneath roller frame assembly 111 and guide chain assembly 111 around second portion 115b, thereby maintaining chain position for engagement by drive sprocket 102.

Although FIG. 1 is illustrated as a "high-drive" machine (i.e., a machine with an elevated drive system and two idler wheels), it is contemplated that the idler configurations consistent with the disclosed embodiments may be implemented in any track-type machine. For example, sprocketed idler 117 may be employed in an oval-track machine, wherein the drive system is located in-line with the non-driving wheels, in this case, sprocketed idler 117. Thus, sprocketed idler 117 may be employed in any trac-type machine, regardless of the size, type, and configuration of the drive system associated with the machine in which it is employed.

Figure 2:
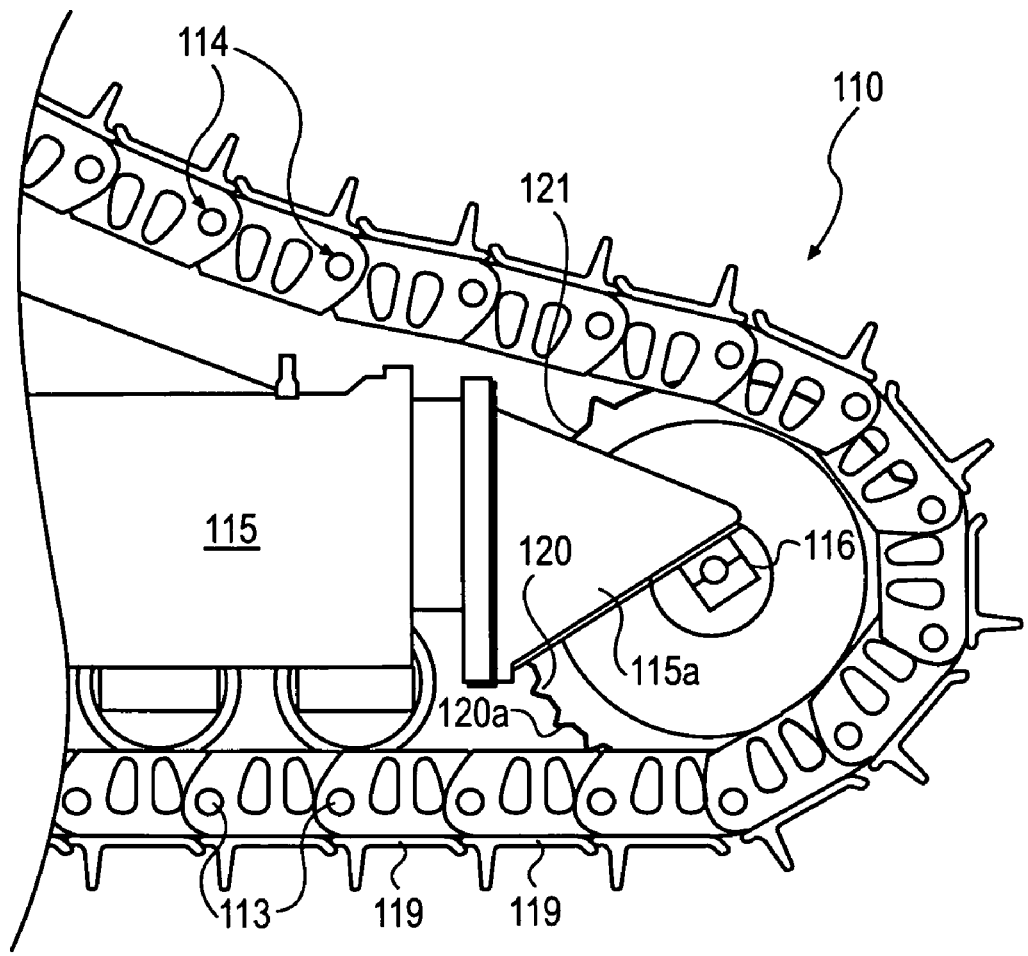
FIG. 2 illustrates an exemplary portion of a track assembly of the track-type machine of FIG. 1, in accordance with the disclosed embodiments.

As illustrated in FIG. 2, sprocketed idler 117 may include a plurality of teeth 120 disposed radially about a circumferential edge 121 of sprocketed idler 117. Each of the plurality of teeth 120 may include a plurality of sloped tooth flanks 120a, each of which is configured to provide a ramp-type surface that engages bushings 114 of link members 112. Such a sloped surface allows bushing 114 to gradually engage circumferential edge 121, thereby reducing noise and vibration that may be caused by abrupt contact between bushings 114 and circumferential edge 121.

Figure 3:
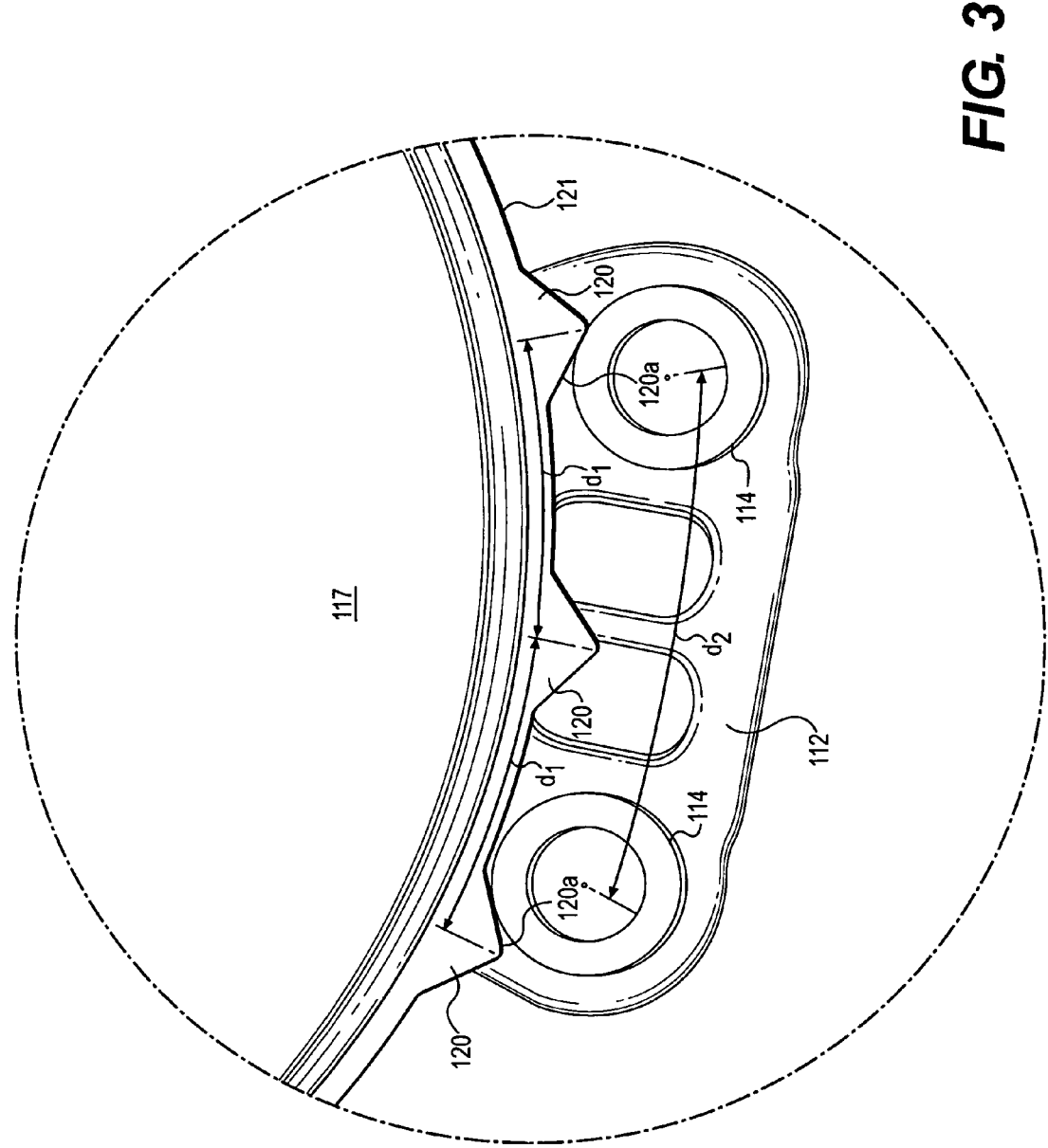
FIG. 3 illustrates a detailed side view of an exemplary sprocketed idler/track link interface consistent with the disclosed embodiments.

Tooth flanks 120a associated with each of the plurality of teeth 120 may be designed and manufactured with any slope value suitable for reducing undercarriage noise and vibration caused by the contact between bushings 114 and sprocketed idler 117. According to one embodiment, each of tooth flanks 120a may have a uniform slope value (i.e., a single slope value along the entire length of tooth flank 120a). It is contemplated, however, that each of tooth flanks 119a may be designed to possess a plurality of slope values so as to, for example, provide a more gradual interface between a tooth flank 120a as the bushing travels from the upper portion of the tooth flank to a lower portion of the tooth flank near circumferential edge 121. FIG. 3 provides a more detailed illustration of the configuration of the teeth of spocketed idler 117.

FIG. 3 illustrates a magnified side view of the interface between teeth 120 and link member 112 associated with chain assembly 111. As illustrated in the exemplary embodiment of FIG. 3, each of tooth flanks 120a may have a substantially uniform slope. By providing a tooth flank with a uniform slope and a relatively moderate slope angle, bushing 114 of link member 112 may, as bushing 114 reaches the lower portion of tooth flank 120a, contact circumferential edge 121 before losing contact with tooth flank 120a. Such a transition may prevent bushing (and the portion of the weight of the machine corresponding therewith) from making abrupt contact with the idler, thereby limiting or minimizing excessive vibration and noise that is often associated with such abrupt contact. This may be particularly advantageous as the machine travels over uneven terrain, where lateral and non-uniform movement track movement may make the machine undercarriage more vulnerable to noise, vibration, and wear associated with the "bouncing" and "jarring" of the machine while traveling over such terrain.

Each of the plurality of teeth 120 may be evenly spaced and may project radially from circumferential edge 121. According to one embodiment, the spacing between each of the plurality of teeth 120 may be defined as follows:

$$d_1 \approx \frac{2}{3} \cdot d_2 \qquad \text{Equation 1}$$

where $d_1$ represents the pitch of sprocketed idler 117 (i.e., the distance between the center of one tooth and the center of an adjacent tooth) and $d_2$ represents the pitch of link member 112 (i.e., the distance between the centers of bushings 114 associated with link member 112). It should be noted that Equation 1 is approximated based on, for example, the circumference of bushings 114, the distance between bushings 114, the size of link members 112, and other such specifications of track assembly 110. Consequently, it is contemplated that a different spacing between each of the plurality of teeth 120 may be employed without departing from the scope of the present disclosure. Thus, Equation 1 is exemplary only and not intended to be limiting.

For example, as an alternative or in addition to Equation 1, the spacing between each of the plurality of teeth may be derived experimentally, based on the dimensions of the link member to be implemented in track assembly 110. For example, as illustrated in FIG. 3, the pitch of sprocketed idler 117 may be defined such that when link member 112 is centered on the peak of a sprocket tooth, each bushing 114 of link member 112 contacts sprocketed idler 117 on the sloped portion of tooth flank 120a located on either side of the sprocket tooth centered on link member 112. Such spacing allows link member 112 to swivel up and down on the tooth flanks, which may provide increased flexibility of movement on uneven terrain, when compared with conventional, arcuate-type idler assemblies. Furthermore, the sloped flanks of each of the plurality of teeth 120 provide a more gradual landing for each of bushings 114 onto circumferential edge 121.

Stated another way, the spacing between each of the plurality of teeth 120 may be defined such that a distance between adjacent peaks of the plurality of teeth is within a predetermined threshold of the distance between central axes of adjacent pin members of a track link that is engageable by the idler. According to one embodiment, the spacing between each of the plurality of teeth 120 may be defined such that a distance between adjacent peaks of the plurality of teeth is between 30% and 90% of the distance between central axes of adjacent pin members of a track link that is engageable by the idler. According to another embodiment, the spacing between each of the plurality of teeth 120 may be defined such that a distance between adjacent peaks of the plurality of teeth is between 60% and 70% of the distance between central axes of adjacent pin members of a track link that is engageable by the idler. In yet another embodiment, the spacing between each of the plurality of teeth 120 may be defined such that a distance between adjacent peaks of the plurality of teeth is about ⅔ of the distance between central axes of adjacent pin members of a track link that is engageable by the idler.

Figure 4:
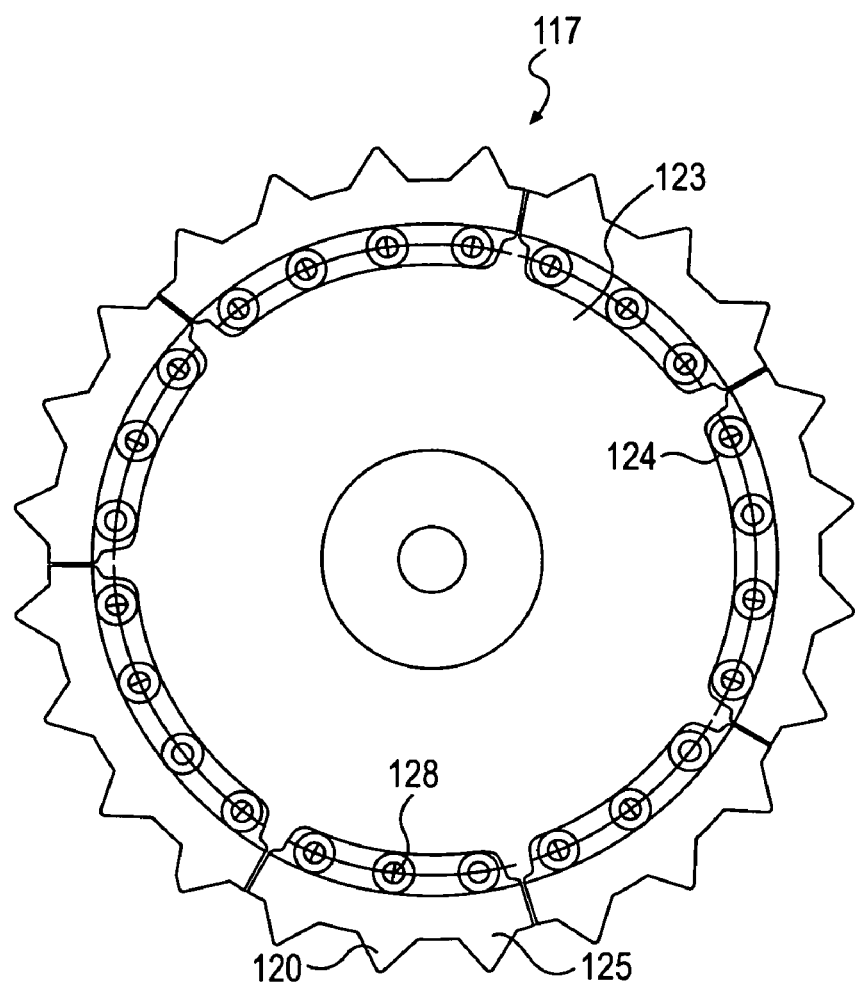
FIG. 4 illustrates a side view of an exemplary sprocketed idler for use with the exemplary track assembly illustrated in FIG. 2.
Figure 5:
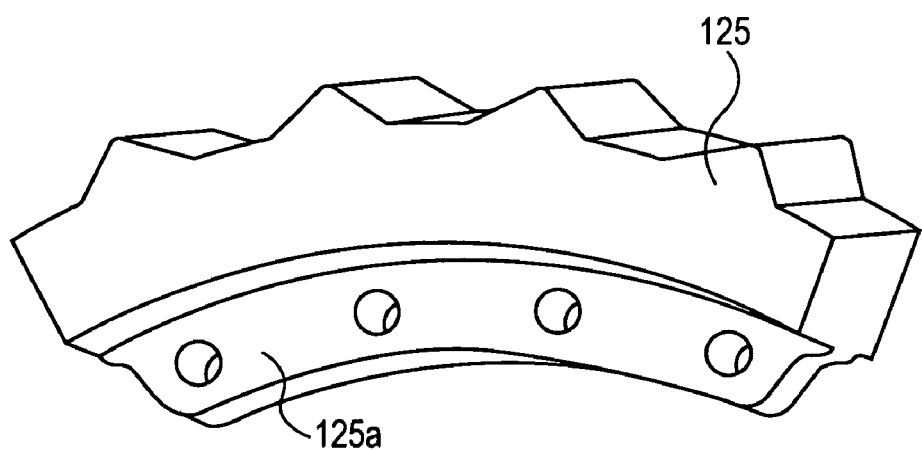
FIG. 5 provides a perspective view of a portion of an exemplary sprocketed idler, consistent with the disclosed embodiments.

It is contemplated that sprocketed idler 117 may be manufactured as a single element, with each of the plurality of teeth 120 integrally formed from a single piece of material. Alternatively, and as illustrated in FIGS. 4 and 5, sprocketed idler 117 may be assembled from a plurality of components, each of which may have been independently manufactured. For example, as illustrated in FIG. 4, sprocketed idler 117 may include an idler wheel portion 123 having a plurality of holes 124 for mounting a plurality of individual sprocketed teeth segments 125, each segment having a plurality of holes corresponding to holes 124 associated with idler wheel 123. Consequently, each of sprocket teeth segments 125 may be secured to idler wheel portion 123 using fastening devices 128 including, for example, nuts and bolts, threaded machine bolts, rivets, of any other suitable mechanical fastening device. Alternatively or additionally, one or more of sprocketed teeth segments 125 may be secured to idler wheel 123 using temporary or permanent welding techniques.

According to one exemplary embodiment, each of sprocketed teeth segments 125 may include a flange 125a that is designed to fit in a corresponding groove (not shown) associated with idler wheel 123. Flange 125a may be configured to ensure proper alignment of each of sprocketed teeth segments 125. Furthermore, flange 125a, when properly seated and secured within a groove of idler wheel 123, may prevent lateral movement and/or twisting of sprocketed teeth segments 125.

INDUSTRIAL APPLICABILITY

The track assembly systems consistent with embodiments disclosed and described herein provide a solution for reducing vibration, noise, and wear associated with undercarriages on track-type machines. Specifically, the sloped-flank design and spacing of the sprocket teeth described herein provide a system that enables link members 112 of chain assembly 111 to swivel based on the load distribution requirements of the machine. In contrast, conventional track assemblies that utilize arcuate rollers do not allow movement along tooth flanks due, in large part, to the steep and somewhat deep grooves formed by the flank faces of consecutive teeth. Moreover, although conventional bald (non-sprocketed) assemblies may allow for more flexible movement under load conditions on uneven ground, they do not provide a sloped interface for dampening the landing of bushings 114 against the circumferential edge of the idler.

Although the disclosed embodiments are described and illustrated as being associated with a track-type construction or mining vehicle, it may be applicable to any machine environment where it may be advantageous to reduce or eliminate vibration, noise, and wear caused by abrupt contact between a chain assembly and an idler wheel. Specifically, the sprocketed assembly described herein may be particularly advantageous in machine systems that rely on idler pulleys or wheels to engage, support, and guide chain-driven machines, as it may reduce unnecessary vibration, noise, and wear caused by grinding at the interface of the chain and the idler.

The presently disclosed track assembly with sprocketed idler may have several advantages. For example, the track assembly described herein provides an idler having sloped-flanked teeth, which allows bushings that are traveling about the idler to gradually move along the length of the slope as the weight of the load is distributed across the tracks. As a result, the presently disclosed track assembly may significantly reduce vibration, noise, and wear associated with the grinding and/or slamming of the track bushings against round (non-sprocketed idlers) and/or along the steep arcuate flanks provided by some conventional idlers.

Furthermore, the track assembly consistent with the disclosed embodiments may result in a significantly smoother ride for the operator when compared to conventional track assemblies, particularly on uneven terrain. For example, because the track system described herein provides sloped, ramp-shaped teeth that allow the machine to swivel between the flanks of the teeth as the weight applied to the traction devices shifts, the bushings and link members are allowed certain flexibility of movement, allowing the bushings and links to achieve a point of equilibrium with the surrounding terrain. In contrast, most conventional sprocketed idlers such as, for example, arcuate sprocketed idlers do not allow sufficient freedom for the bushings distribute weight, which creates unbalanced forces at the interface between the bushings and the teeth. Once the bushing is released from between the teeth, these forces become unopposed, causing significant vibration and noise in the track assembly.

Moreover, certain embodiments described herein disclose a solution for assembling a sprocketed idler by mounting a plurality of sprocketed teeth segments onto a generic idler wheel. By enabling the customization of different sprocketed idlers using a common idler wheel, storage, product, and inventory maintenance costs associated with producing and stocking a number of sprocketed idlers for each different size and type of machine may be significantly reduced. For example, each machine that is being manufactured may be equipped with the same idler wheel, regardless of the type and size of chain assembly that is required for the machine. After manufacture, the machine may be subsequently customized with the appropriately-sized teeth segments, which have a substantially smaller footprint than a single, monolithic sprocketed idler, reducing storage costs. Further, because the same idler wheel may be used for each machine, costs associated with manufacturing and production of different idlers for each machine may be reduced or eliminated.

Additionally, by providing an idler assembly that allows for the replacement of individual teeth segments, repair costs may be significantly reduced. For example, if, during operation of the machine, one or more teeth become worn or damaged, only segments associated with the worn or damaged teeth may require replacement, without requiring removal and replacement of the entire idler. As a result, material costs associated with the repair may be limited to the damaged segment, as opposed to costs associated with complete replacement of the idler assembly. Furthermore, because replacing individual teeth segment (which requires removal of only a few bolts on the periphery of the idler) requires substantially less time than is required to replace the entire idler (which may require removal of the track assembly), the presently disclosed system may reduce machine downtime and production costs associated therewith.

What is claimed is:

1. A sprocketed idler for a machine, comprising:
a plurality of teeth radially disposed about an idler having a substantially circular cross section, each of the plurality of teeth including at least one tooth flank,
wherein a distance between adjacent peaks of the plurality of teeth is between 30% and 90% of the distance between central axes of adjacent pin members of a track link that is engageable by the idler, the distance between adjacent peaks of the plurality of teeth being defined such that, when the track link is centered on a center of a first tooth, bushings associated with the track link contact the idler at a sloped surface of each tooth flank located on either side of the first tooth.

2. The idler of claim 1, wherein the distance between adjacent peaks of the plurality of teeth is between 60% and 70% of the distance between the central axes of adjacent pin members of the track link.

3. The idler of claim 1, wherein the distance between adjacent peaks of the plurality of teeth is approximately ⅔ of the distance between the central axes of adjacent pin members of the track link.

4. The idler of claim 1, wherein each of the plurality of teeth includes a substantially triangular cross-section.

5. A track assembly for a machine, comprising:
a plurality of link members;
a plurality of pin members, each pin member configured to couple adjacent link members together to form a track chain and each comprising a bushing disposed about a cylindrical surface thereof; and
at least one idler comprising a plurality of teeth disposed about a surface of the at least one idler, the at least one idler configured to engage a portion of the bushing and substantially limit contact between the at least one idler and a surface of the plurality of link members;
wherein one or more of the plurality of teeth includes a tooth flank, and a distance between adjacent peaks of the plurality of teeth is between 30% and 90% of the distance between central axes of adjacent pin members of a track link that is engageable by the idler, the distance between adjacent peaks of the plurality of teeth being defined such that, when the track link is centered on a center of a first tooth, bushings associated with the track link contact the idler at a sloped surface of each tooth flank located on either side of the first tooth.

6. The track assembly of claim 5, wherein a pitch of the idler is less than a pitch of each of the plurality of link members.

7. The track assembly of claim 5, wherein a pitch of the idler is approximately ⅔ of a pitch of each of the plurality of link members.

8. The track assembly of claim 5, further including a drive assembly comprising:
a motor for generating a torque output; and
a drive sprocket, operatively coupled to the motor and configured to engage a portion of the bushing and rotate in response to the torque output generated by the motor.

9. The track assembly of claim 8, further including a roller frame having a first end portion and a second end portion, wherein the at least one idler includes a first idler and a second idler, the first idler rotatably mounted on the first end portion of the roller frame and a second idler rotatably mounted on the second end portion of the roller frame.

10. The track assembly of claim 5, wherein the one or more of the plurality of teeth includes a substantially triangular cross-section.

11. A machine, comprising:
a driving mechanism for generating a torque output;
a drive sprocket, operatively coupled to the driving mechanism and configured to rotate in response to the torque output generated by the driving mechanism;
a track assembly for the machine, comprising:
a plurality of link members;
a plurality of pin members, each pin member configured to couple adjacent link members together to form a track chain and each comprising a bushing disposed about a cylindrical surface thereof; and
at least one idler including a plurality of teeth disposed about a surface of the at least one idler, the at least one idler configured to engage a portion of the bushing and substantially limit contact between the at least one idler and a surface of the plurality of link members;
wherein one or more of the plurality of teeth includes a tooth flank and a distance between adjacent peaks of the plurality of teeth is between 30% and 90% of the distance between central axes of adjacent pin members of a track link that is engageable by the idler, the distance between adjacent peaks of the plurality of teeth being defined such that, when the track link is centered on a center of a first tooth, bushings associated with the track link contact the idler at a sloped surface of each tooth flank located on either side of the first tooth.

12. The machine of claim 11, wherein a pitch of the idler is less than a pitch of each of the plurality of link members.

13. The machine of claim 11, wherein a pitch of the idler is approximately ⅔ of a pitch of each of the plurality of link members.

14. The machine of claim 11, wherein the driving mechanism includes at least one of electric motor and an internal combustion engine.

15. The machine of claim 14, further including a roller frame having a first end portion and a second end portion, wherein the at least one idler includes a first idler and a second idler, the first idler rotatably mounted on the first end portion of the roller frame and a second idler rotatably mounted on the second end portion of the roller frame.

16. The machine of claim 11, wherein the one or more of the plurality of teeth is substantially triangular in shape.

17. The idler of claim 1, wherein the at least one tooth flank has a substantially constant slope along the length of the at least one tooth flank.

18. The track assembly of claim 5, wherein the tooth flank has a substantially constant slope along the length of the tooth flank.

19. The machine of claim 11, wherein the tooth flank has a substantially constant slope along the length of the tooth flank.

* * * * *